(12) United States Patent
Nakazaki et al.

(10) Patent No.: US 6,750,439 B2
(45) Date of Patent: Jun. 15, 2004

(54) LIGHT CURTAIN GENERATING DEVICE INCLUDING SINGLE-BEAM OPTICAL MODULES

(75) Inventors: Takao Nakazaki, Kyoto (JP); Satoru Shimokawa, Kyoto (JP); Ichiro Kondo, Kyoto (JP); Yasushi Miyake, Kyoto (JP); Noboru Kawaike, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/925,647

(22) Filed: Aug. 10, 2001

(65) Prior Publication Data

US 2002/0017604 A1 Feb. 14, 2002

(30) Foreign Application Priority Data

Aug. 11, 2000 (JP) ........................................ 2000-245228
Jul. 5, 2001 (JP) ........................................ 2001-204494

(51) Int. Cl.⁷ ................................................ G01V 9/04
(52) U.S. Cl. ........................................ 250/221; 340/555
(58) Field of Search ............................... 250/221, 222.1; 340/555, 556, 557; 361/170, 189; 100/342, 348; 192/129 A, 129 R, 130

(56) References Cited

U.S. PATENT DOCUMENTS

| | | | | |
|---|---|---|---|---|
| 3,805,061 A | * | 4/1974 | De Missimy et al. | 250/208.3 |
| 5,198,661 A | * | 3/1993 | Anderson et al. | 250/221 |
| 5,302,942 A | * | 4/1994 | Blau | 340/556 |
| 5,461,227 A | * | 10/1995 | Blau | 250/221 |
| 6,166,371 A | * | 12/2000 | Milbrath et al. | 250/221 |
| 6,175,106 B1 | * | 1/2001 | Buitkamp et al. | 250/221 |
| 6,236,036 B1 | * | 5/2001 | Kudo et al. | 250/221 |
| 6,239,423 B1 | * | 5/2001 | Hama et al. | 250/221 |
| 6,294,777 B1 | * | 9/2001 | Shteynberg et al. | 250/221 |
| 6,297,498 B1 | * | 10/2001 | Shteynberg et al. | 250/221 |
| 6,414,603 B1 | * | 7/2002 | Yamaguchi et al. | 340/815.4 |
| 6,518,565 B1 | * | 2/2003 | Wu et al. | 250/239 |

FOREIGN PATENT DOCUMENTS

| | | |
|---|---|---|
| DE | 43 12 947 C1 | 6/1994 |
| DE | 197 12 828 A1 | 10/1998 |

\* cited by examiner

*Primary Examiner*—Stephone B Allen
(74) *Attorney, Agent, or Firm*—Foley & Lardner

(57) ABSTRACT

In a light curtain generating device comprising a pair of pillar assemblies for supporting arrays of light emitting and receiving units which are placed opposite to each other so as to form a light curtain for detecting an object between the pillar assemblies, the light emitting and receiving unit arrays each consist of a group of single-beam optical modules so that the length of the arrays of light emitting and receiving units and the pitches of the individual light emitting and receiving units can be selected at will. Therefore, the light curtain generating device can readily adapt itself to each particular application at low cost and in a highly precise manner.

12 Claims, 18 Drawing Sheets

LIGHT CURTAIN GENERATING DEVICE INCLUDING SINGLE-BEAM OPTICAL MODULES

TECHNICAL FIELD

The present invention relates to a light curtain generating device for sensing the entry of a human body or the like into a designated danger area, and in particular to a light curtain generating device which can adjust the length of the light emitting and receiving pillar assemblies, number of light beams and pitch of the light beams according to the width of the danger area, the diameter of the smallest possible object that is desired to be detected, and so on, in a flexible manner.

BACKGROUND OF THE INVENTION

As well known in the art, an optical curtain generating device of this kind comprises a light emitting pillar assembly accommodating an array of light emitting units within a pillar case and a light receiving pillar assembly accommodating an array of light receiving units within a pillar case, the light emitting pillar assembly and light receiving pillar assembly being placed opposite to each other so as to form a light curtain for detecting an object between the pillar assemblies.

The arrays of light receiving and emitting units accommodated in the pillar cases are typically formed by combining a plurality of multi-beam optical modules each having a unit number of light beams (such as four, eight and sixteen light beams). Each multi-beam optical module comprises a number of optical elements (a light emitting element and a light emitting lens in the case of a light emitting unit, and a light receiving element and a light receiving lens in the case of a light receiving unit,) corresponding to the unit number of light beams which are integrally incorporated in a plastic holder which fixes the pitch of the light beams. Such a multi-beam optical module is disclosed in Japanese patent laid open (kokai) publication No. 10-74432.

However, according to such a conventional light curtain generating device, because the length of the light emitting and receiving pillar assemblies, number of light beams, pitch of the light beams and so forth are determined by the combination of multi-beam optical modules each having a fixed number of light beams and a fixed light beam pitch, the following problems are known to exist.

(1) Because the number of light beams which matches the width (A1) of the designated danger area cannot be selected at will as illustrated in FIG. 18, the length of the light emitting and receiving pillar assemblies (Z6 and Z7) may be longer than necessary. In such a case, the light emitting and receiving pillar assemblies (Z6 and Z7) may extend beyond the machine (such as a stamp forming machine Z1), and occupy more space than desired. Also, the unnecessary light beams (the area of unused light beams A2) mean a waste in cost. It is also possible that an object outside the designated danger area may be detected, and the machine may be turned off unnecessarily. On the other hand, if the light emitting and receiving assemblies are selected to fit within the designated danger area (A1), the presence of insensitive areas in the upper and lower ends may prevent the necessary width for detection from being attained.

In FIG. 18, Z1 denotes a stamp forming machine, Z2 denotes a front opening, Z3 denotes an upper block, Z4 denotes a lower block, Z5 denotes a stamp forming zone, Z6 is a light emitting pillar assembly, and Z7 denotes a light receiving pillar assembly.

(2) Because the only possible light beam pitches are the basic pitch of the light beams inherent to the particular multi-beam optical module and a multiple thereof, the light beam pitch cannot be optimized for the particular diameter of the smallest possible object that is desired to be detected.

(3) Because the optical module has a plurality of light beams, it tends to be large in size and highly complex so that the assembly process is hard to be mechanized.

(4) Because the optical module has a plurality of light beams, a large metallic die assembly is required for the fabrication thereof, and the cost for the metallic die assembly increases.

(5) Because the optical module has a plurality of light beams, its length increases, and ensuring the required optical precision becomes difficult because the warping of the molded product becomes difficult to control as the length of the molded product increases.

(6) Because various kinds of optical modules are needed for different light beam pitches, stocking them creates a problem, and the cost for the metallic die assemblies is therefore high. For instance, if the light beam pitches include 15 mm and 20 mm, a separate metallic die assembly is needed for each of them. If the light beam pitches include 15 mm and 30 mm, and a 30 mm pitch is achieved by using the 30 nun pitch optical module by enabling only every second light beam, there are unused optical components (such as lenses) between each pair of adjacent light beams that are used, and the cost for the unused optical components will be wasted.

SUMMARY OF THE INVENTION

The present invention was made in view of such problems of the prior art, and a primary object of the present invention is to provide a light curtain generating device which can be selectively fabricated so as to be adjustable with respect to the length of the light emitting and receiving pillar assemblies, number of light beams and pitch of the light beams according to the width of the danger area, the diameter of the smallest possible object that is desired to be detected, and so on, in a flexible manner.

A second object of the present invention is to provide a light curtain generating device which can readily adapt itself to each particular application at low cost.

A third object of the present invention is to provide a light curtain generating device which can readily adapt itself to the desired length of the detection area in a highly precise manner.

The light curtain generating device of the present invention comprises a light emitting pillar assembly accommodating an array of light emitting units within a pillar case and a light receiving pillar assembly accommodating an array of light receiving units within a pillar case, the light emitting pillar assembly and light receiving pillar assembly being placed opposite to each other so as to form a light curtain for detecting an object between the pillar assemblies.

The light emitting unit array and light receiving unit array received in the respective pillar cases comprise a group of single-beam optical modules.

Thus, the light emitting and receiving pillar assemblies can be fabricated so as have a length which is adjustable by each single light beam so that the device can be adapted to each particular width of the designated danger area in a flexible manner.

According to the present invention, each opposing pair of a light emitting unit and a light receiving unit may perform a detecting action in a prescribed order.

Thus, a proper detecting action can be ensured without risking interferences between adjacent optical modules.

According to the present invention, each single-beam optical module may consist of a light emitting unit or a light receiving unit comprising a lens, an optical element and a holder integrally incorporated with them so as to align them with a prescribed optical axial line.

The optical element consists of a light emitting element in the case of a light emitting unit and a light receiving element in the case of a light receiving unit.

Thus, the handling of the single-beam optical module during the fabrication process can be simplified.

According to a preferred embodiment of the present invention, the holder may be made of plastic material.

Thus, only one kind of metallic die assembly is required for the fabrication process, and the cost for the metallic die assembly can be minimized.

The single-beam optical modules serving as the light emitting units or as the light receiving units may be identical to one another. Thereby, the management and fabrication of the single-beam optical modules can be simplified.

According to the present invention, the lens and optical element may be joined to the plastic holder by snap fit arrangements.

Thus, the assembly of each single-beam optical module can be mechanized, for instance, by using a robot.

According to the present invention, each group of single-beam optical modules may comprise an optical module block including a plurality of single-beam optical modules arranged in a single row by being attached to a metallic plate having a prescribed length.

Thus, a plurality of single-beam optical modules can handled in a single body, and they may be retained by a metallic plate. Therefore, a plastic holder for retaining them is not needed, and no cost is required for a metallic die assembly for molding such a plastic holder. Furthermore, because any desired mounting pitch of the single-beam optical modules can be readily achieved by a simple metal working process, and the change in the light beam pitch can be effected at low cost and in a flexible manner.

According to the present invention, each single-beam optical module forming the optical module block may be attached to the metallic plate at a side of the single-beam optical module extending in parallel with the optical axial line.

Thus, the optical axial line and the metallic plate are in parallel to each other, and the accuracy of the optical axial line can be ensured more easily as compared with the case where each single-beam optical module is supported at a bottom surface thereof.

According to the present invention, each single-beam optical module forming the optical module block may be attached to the metallic plate by a snap fit arrangement.

Thus, the assembly of each single-beam optical module can be easily mechanized, for instance, by using a robot.

According to the present invention, the device may further comprise a circuit board having a plurality of optical element mountable, and signal processing means for electrically and selectively disabling the optical element mountable positions.

Thus, by omitting one out of a certain number of single-beam optical modules, an optical pitch which is a multiple of the basic light beam pitch can be accomplished, and no components will be wasted between adjacent light beams as was the case with the conventional arrangement.

According to a particularly preferred embodiment of the present invention, each pillar assembly comprises at least two base frames arranged in series along a length of the pillar assembly each defining mounting positions for single-beam optical modules, and a plurality of single-beam optical modules mounted in the mounting positions of the base frames. This embodiment allows a free selection of the arrangement of the single-beam optical modules.

For instance, the mounting positions of the two base frames may have different pitches. Additionally or alternatively, the two base frames may have different numbers of mounting positions and/or different lengths.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
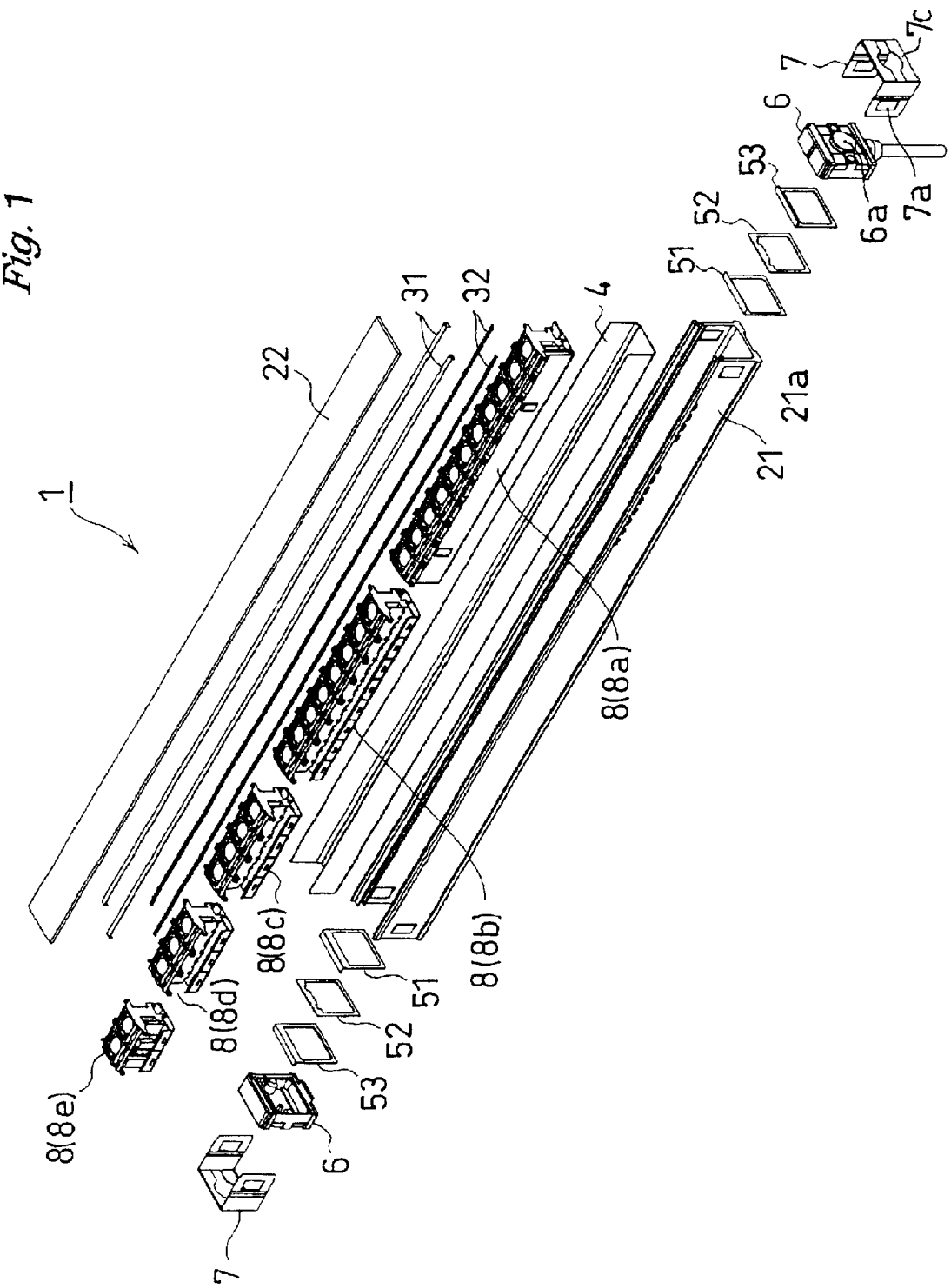
FIG. 1 is an exploded perspective view of the light emitting (receiving) pillar assembly according to the present invention.

FIG. 1 is an exploded perspective view of a pillar assembly for light emission (reception) embodying the present invention. As mentioned earlier, the light curtain generating device of the present invention comprises a light emitting pillar assembly including a pillar case accommodating an array of light emitting elements, and a light receiving pillar assembly including a pillar case accommodating an array of light receiving elements. The light emitting and receiving pillar assemblies are placed opposite to each other with a certain space defined between them so that a light curtain for detecting an object is formed between the light emitting and receiving pillar assemblies.

In the case of the embodiment illustrated in FIG. 1, each pillar case comprises of a tubular case main body (see FIG. 6) having a rectangular cross section consisting of a case base 21 and a window plate 22, and a pair of end caps 6, 6 closing the two open ends of the case main body 2.

More specifically, an open side end of the U-shaped case base 21 is closed by the window plate 22 via rubber gaskets 31 and adhesive sheets 32 so as to define the tubular case main body 2 having a rectangular cross section.

Each of the two open ends of the tubular case main body 2 having a rectangular cross section formed by the U-shaped case base 21 and the window plate 22 is closed by the corresponding end cap 6 via a laminated assembly of a two-sided adhesive sheet 51, a stainless steel reinforcing plate 52 and a rubber gasket 53, and the end cap 6 is fixedly secured to the case base 21 by a fastener 7 having a rectangular C-shaped cross section.

The pillar case formed as described above accommodates therein an array of light emitting units or light receiving units. The light emitting units and light receiving units are formed by individual single-beam optical modules. The details of the single-beam optical modules are described hereinafter with reference to FIGS. 4 and 5.

That "the light emitting units and light receiving units are formed by individual single-beam optical modules" means that, in the case of a 64-beam light emitting and receiving pillar assembly, each pillar case accommodates 64 light emitting units or 64 light receiving units, and each light emitting unit or each light receiving unit consists of a single-beam optical module. Such a single-beam optical module may be either individually supported or arranged as a part of an integrated group of a number of single-beam optical modules. The mode of supporting each single-beam optical module will become apparent to a person skilled in the art by referring to the following description.

In the case of the embodiment illustrated in FIG. 1, five different kinds of optical module blocks 8a to 8e each having a different number of light beams are shown. The optical module blocks 8a, 8b, 8c, 8d and 8e consist of 11, 8, 4, 3 and 2 single-beam optical module arrays, respectively. The illustrated embodiment consisting of five such optical module blocks is only one of various possible variations, and it does not mean that all of these optical module blocks 8a to 8e need to be accommodated in the pillar cases in each case.

In other words, the light emitting unit arrays and light receiving unit arrays accommodated in the pillar cases form a group of single-beam optical modules, but they are not required to be accommodated in individual separate cases. A number of optical modules may be integrally grouped into blocks in a similar manner as the conventional arrangement, and each pillar case may accommodate a number of such blocks.

In the drawing, numeral 4 denotes an insulating sheet for electrically insulating the case base 21 and optical module blocks 8a to 8e from each other.

Figure 2:
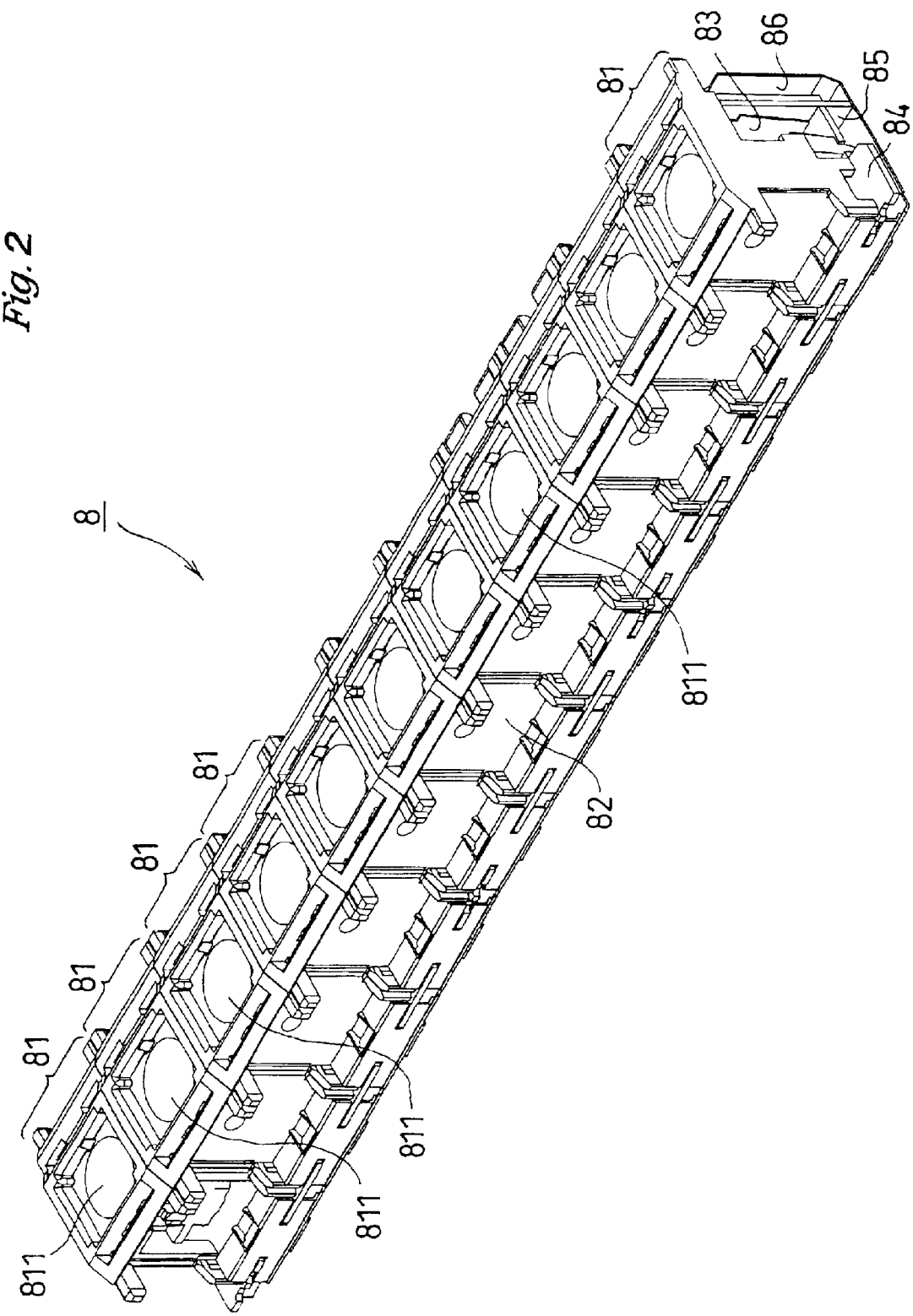
FIG. 2 is a perspective view of an exemplary optical module block.
Figure 3:
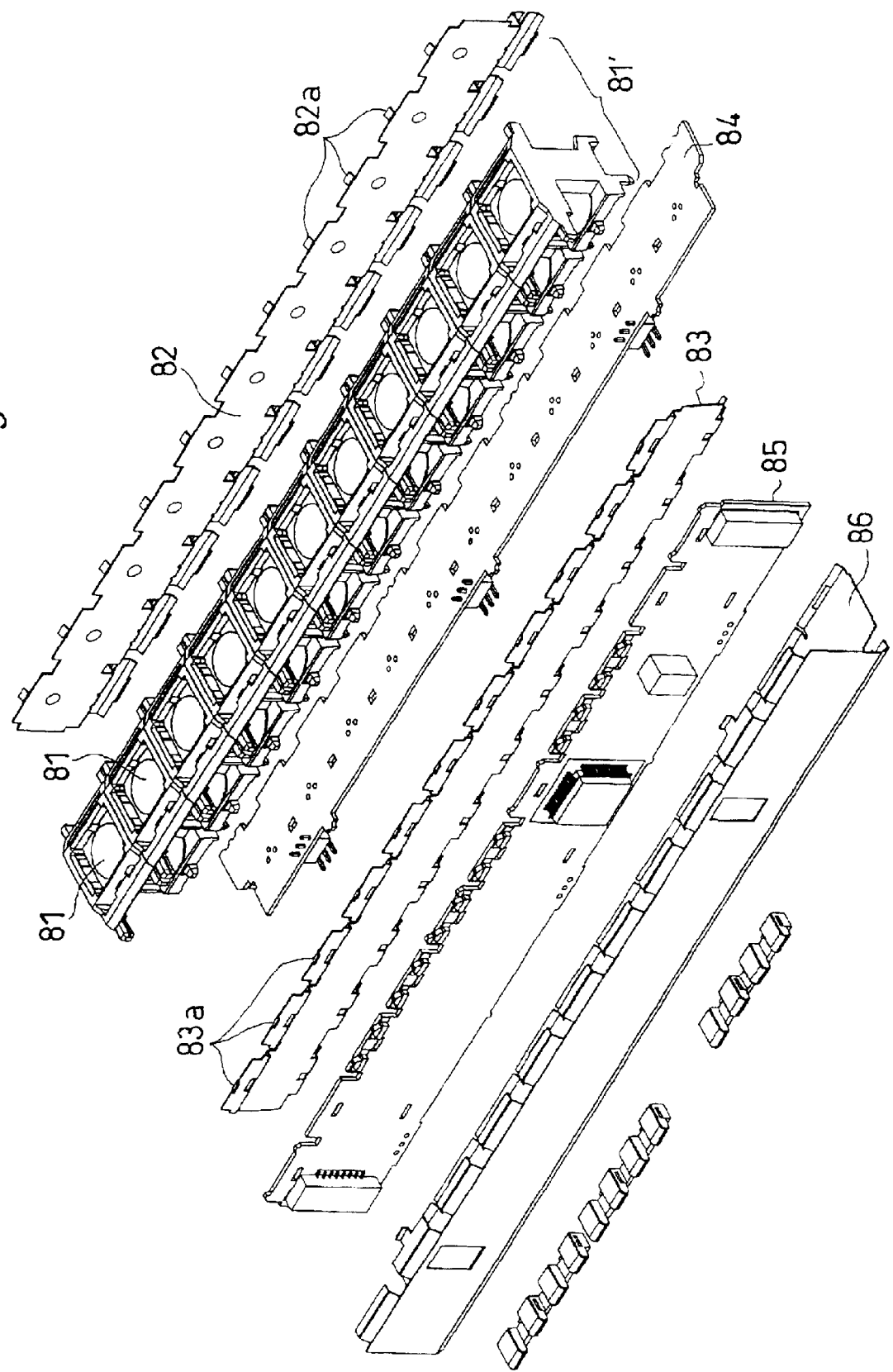
FIG. 3 is an exploded perspective view of the exemplary optical module block.

FIGS. 2 and 3 show enlarged views of one of the five optical module blocks 8a shown in FIG. 1. FIG. 2 is a perspective view of an exemplary optical module block, and FIG. 3 is an exploded perspective view of the optical module block.

As shown in these drawings, the optical module block 8 comprises an array of single-beam optical modules 81', a first base frame 82 made of metallic material, a second base frame 83 made of metallic material, a master light beam circuit board 84, a power circuit board 85 and a shield plate 86.

The single-beam optical module array 81' consists of 11 single-beam optical modules 81 (which are described hereinafter) which are arranged in a single row. In the illustrated embodiment, they are described as being integrally connected to one another, but can be individually separated from one another. In other words, each single-beam optical module 81 forming the single-beam optical module array 81' is integrally assembled by being attached to the first base frame 82 and second base frame 83 at the two sides of the single-beam optical module 81 extending in parallel with the light beam.

Figure 4:
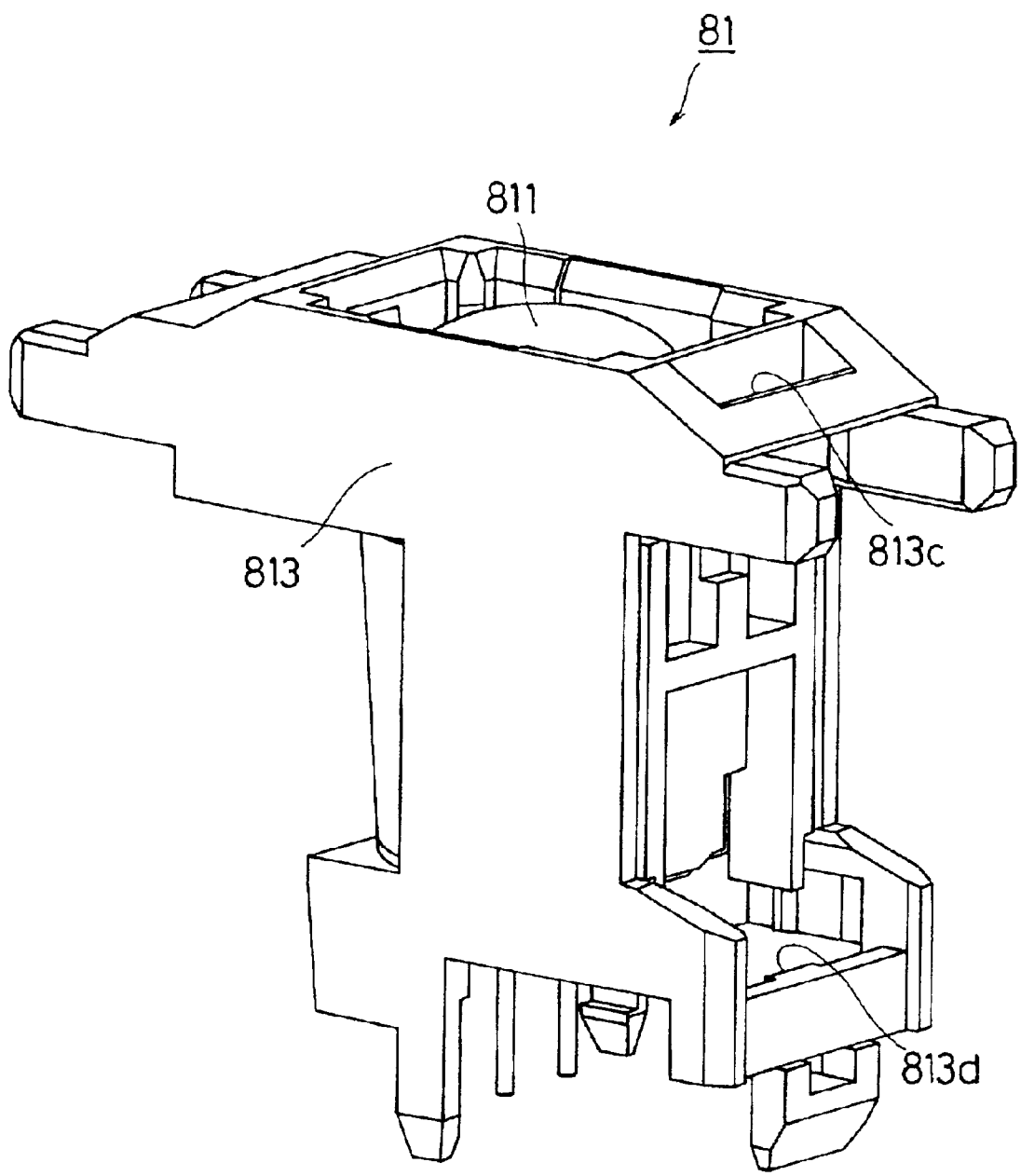
FIG. 4 is a perspective view of an exemplary single-beam optical module.
Figure 5:
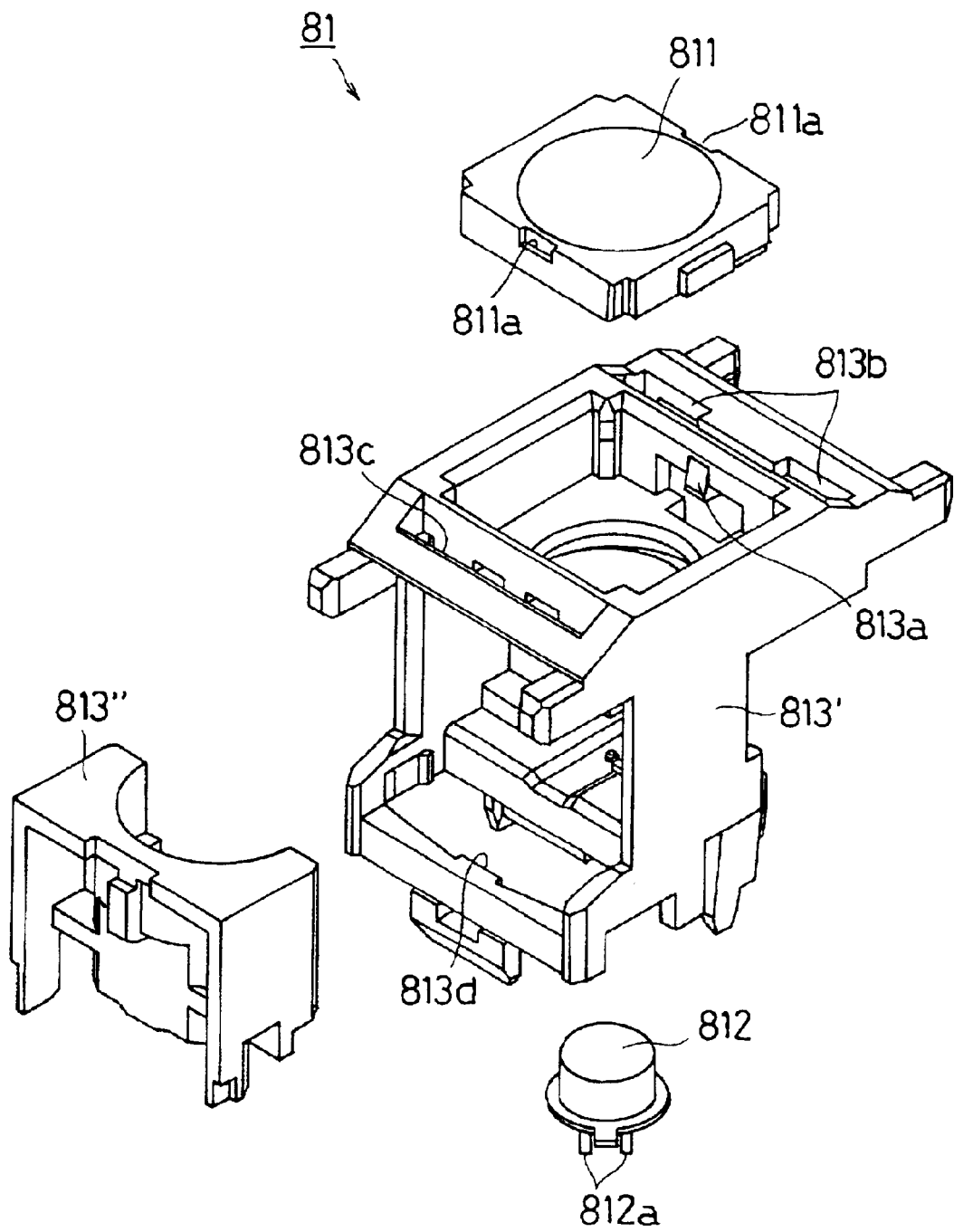
FIG. 5 is an exploded perspective view of the exemplary single-beam optical module.

The details of the single-beam optical module are shown in FIGS. 4 and 5. FIG. 4 is a perspective view of an exemplary single-beam optical module, and FIG. 5 is an exploded perspective view of the single-beam optical module.

As shown in these drawings, the single-beam optical module 81 comprises a lens member 811, an optical element (light emitting or receiving element) 812, and a plastic holder 812 for integrally retaining the optical element in alignment with the light beam. Referring to FIG. 5, the plastic holder 813 consists of a holder main body 813' and a holder retainer piece 813". In this embodiment, the lens member 811, optical element 82 and holder 813 are joined to one another by using a snap fit arrangement. The snap fit arrangement allows one of two pieces that are desired to be joined to be fitted into the other in a resiliently deflected state, and retains the two pieces together by virtue of the restoring force of the one piece after being fitted into the other piece as well known in the art.

Referring to FIG. 5, the lens member 811 is snap fitted into the holder 813 by fitting a pair of projections 813a provided in the holder 813 into a pair of recesses 811a formed in the lens member 811. The optical element 812 is snap fitted into a lower side of the holder 813 although it is not shown in the drawings.

As described hereinafter, the single-beam optical module shown in FIG. 4 is joined to the first base frame 82 and second base frame 83 shown in FIG. 3 also by a snap fit arrangement. In FIGS. 4 and 5, numeral 813b denotes a fitting arrangement for the second base frame 83, numeral 813c denotes a fitting arrangement for the first base frame 82 and numeral 813d denotes a fitting arrangement for the master light beam circuit board 84.

Referring back to FIG. 3, the two sides extending in the direction of the optical axial line of the single-beam optical module array 81' are joined to the first base frame 82 and second base frame 83, respectively, and held between them. As mentioned earlier, the necessary connections can be effected by using snap fit arrangements. More specifically, with the single-beam optical module array 81' held in the properly aligned state by using a suitable jig, the first base frame 82 can be attached to it by snap fit by pressing the first base frame 82 against the corresponding side of the single-beam optical module array 81'. Similarly, with the single-beam optical module array 81' held in the properly aligned state, the second base frame 83 can be attached to it by snap fit by pressing the second base frame 83 against the corresponding side of the single-beam optical module array 81'.

The master light beam circuit board 84 carries electronic components for the light emitting or light receiving element as described hereinafter. The power circuit board 85 carries a communication circuit, processing circuit, I/O circuit, display circuit and so on as described hereinafter.

The master light beam circuit board 84 is attached to the bottom surface of the single-beam optical module array 81' perpendicularly to the optical axial line thereof, and the power circuit board 85 is attached to the backside of the second base frame 83 perpendicularly to the master light beam circuit board 84. The shield plate 86 is formed by bending a relatively thick metallic plate in the shape of letter-L, and is placed over the backsides of the power circuit board 85 and master light beam circuit board 84 to prevent electromagnetic noises from reaching the light emitting circuit or light receiving circuit.

In the illustrated embodiment, the single-beam optical module array 81' is held between a pair of metallic plates (first base frame 82 and second base frame 83) to arrange eleven single-beam optical modules 81 in a single row. However, it is also possible to arrange them in a single row using only one of such metallic plates (first base frame 82 and second base frame 83).

Figure 6:
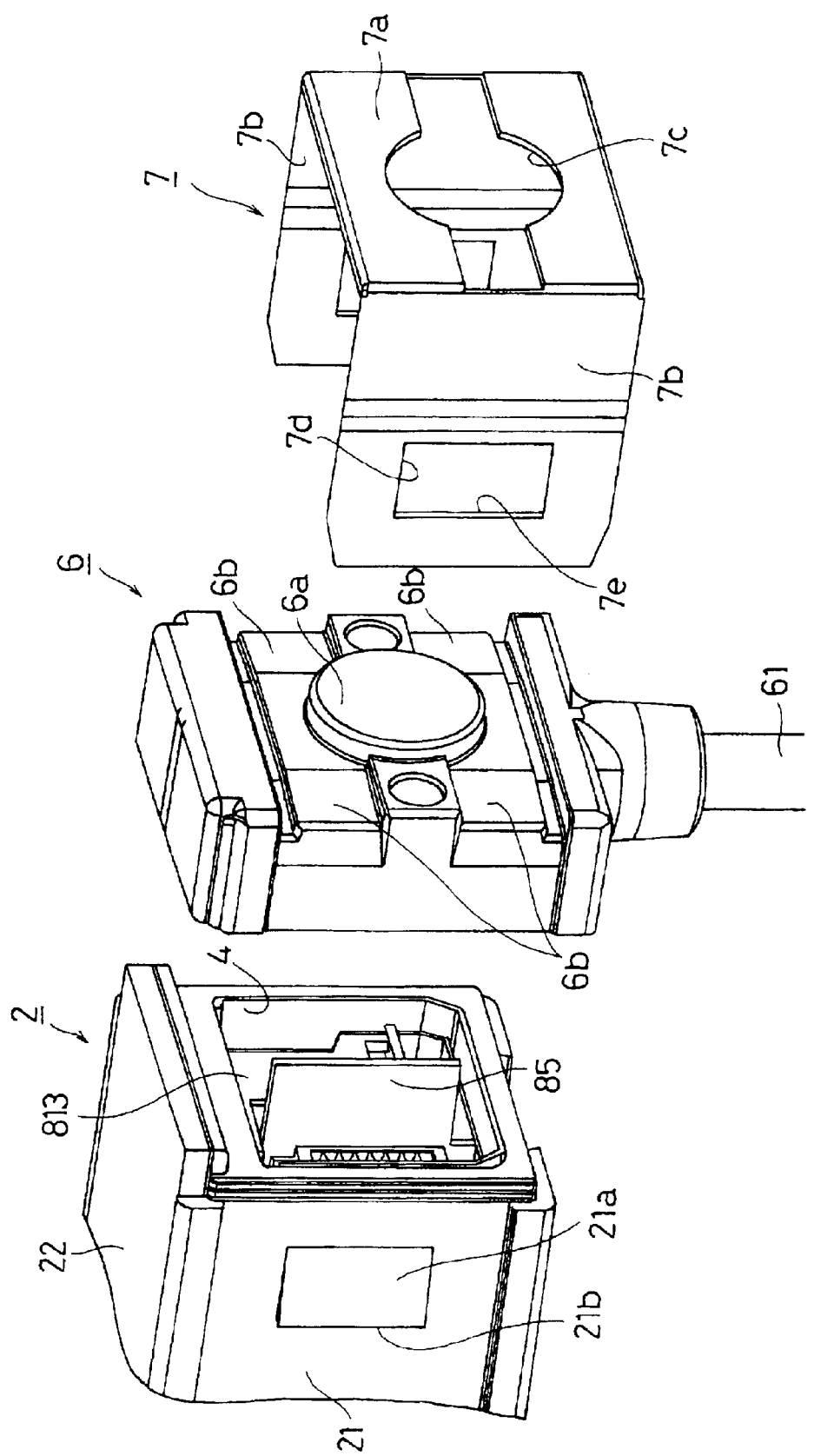
FIG. 6 is an exploded perspective view of an exemplary end cap mounting structure for the pillar case.
Figure 7:
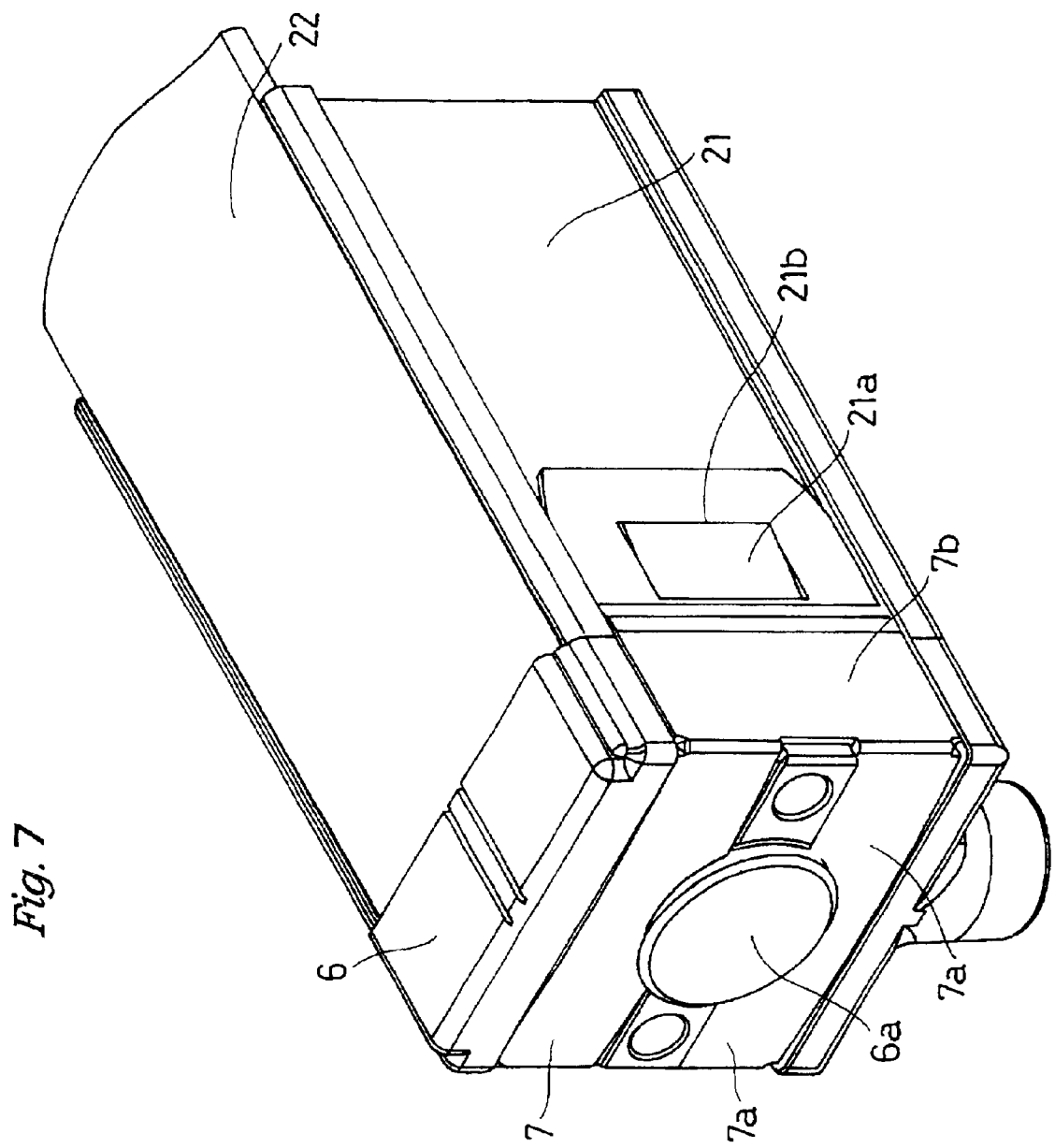
FIG. 7 is a perspective view showing the end cap fitted into the pillar case.

Referring to FIGS. 6 and 7, the arrangement for joining each end cap 6 to the case main body 2 is described in the following. FIG. 6 is an exploded perspective view showing an exemplary arrangement for joining an end cap to a pillar case, and FIG. 7 is a perspective view showing the end cap attached to the pillar case.

As shown in these drawings, the end cap 6 is fixedly attached to the open end of the case main body 2 by a fastener 7 having a rectangular C-shaped cross section.

The fastener 7 comprises a centrally located pressure plate portion 7a, a pair of clamp plate portions 7b extending perpendicularly from both ends thereof. The pressure plate portion 7a is formed with a hole 7c for receiving a projection 6a of the end cap 6 as described hereinafter. The clamp plate portions 7b are slightly resiliently urged toward each other, and are each provided with a rectangular hole 7d for receiving a tapered projection 21a provided on the corresponding side of the case main body centrally in a free end portion thereof.

The end cap 6 consists of a relatively shallow rectangular pan, and its backside is formed with a projection 6a consisting of a central circular bulge and a pair of linear ridges extending laterally from the central circular bulge.

Therefore, when the end cap 6 is placed over the open end of the case base 21 and the fastener 7 is pushed against the backside thereof, the projection 6a of the end cap 6 fits into the hole 7c of the fastener 7 so that the end cap 6 is retained to the fastener 7. At the same time, the tapered projections 21a of the case base 21 fit into the holes 7d of the fastener 7 so that engagement edges 7e of the fastener 7 engage shoulders 21b on either side of the case base 21. Thereby, the fastener 7 is fixedly attached to the case base 21.

As a result, the end cap 6 is firmly attached to an end of the case base 21 via the fastener 7.

Figure 8:
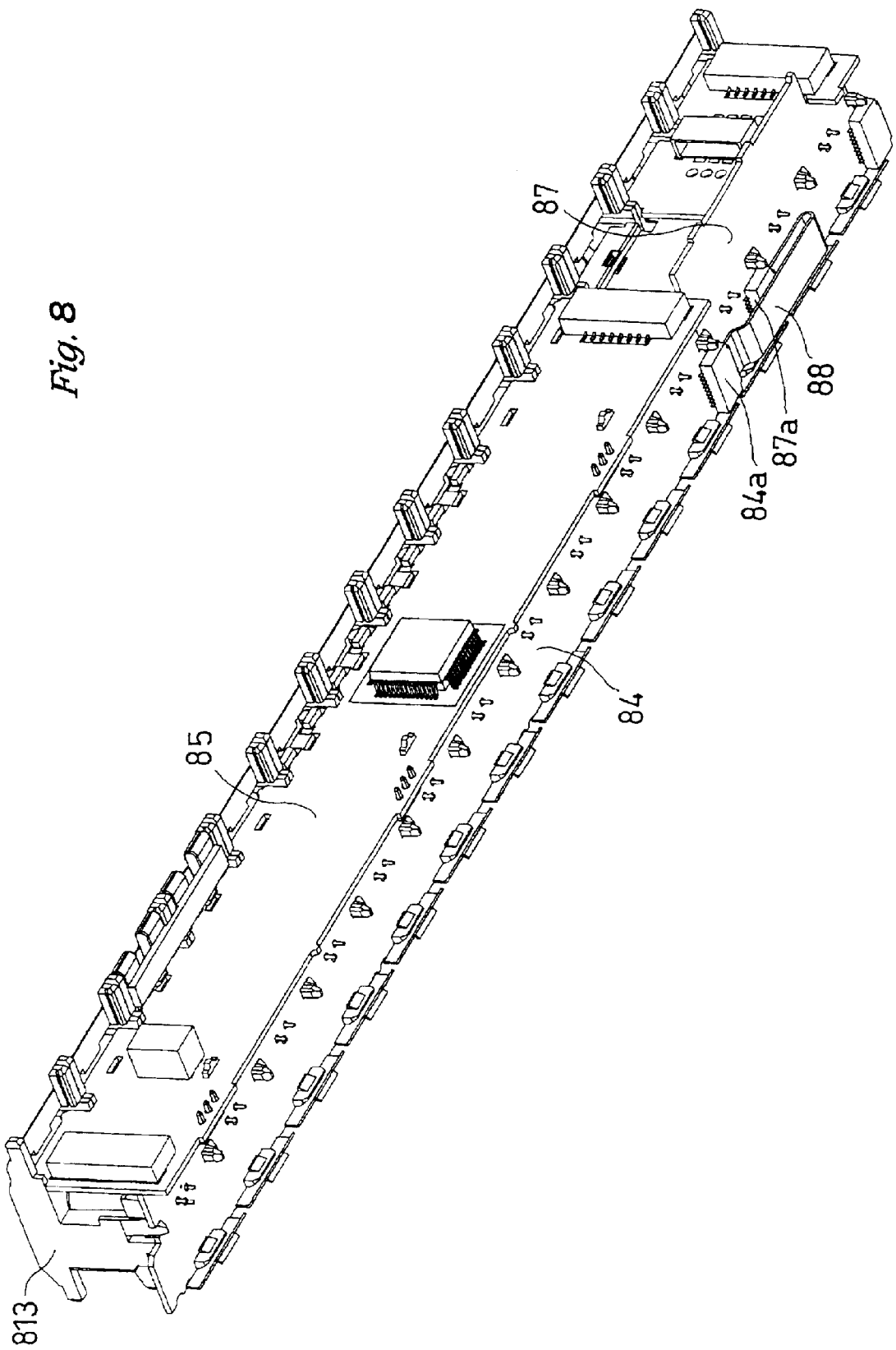
FIG. 8 is a perspective view of the exemplary optical module block as seen obliquely from below.
Figure 9:
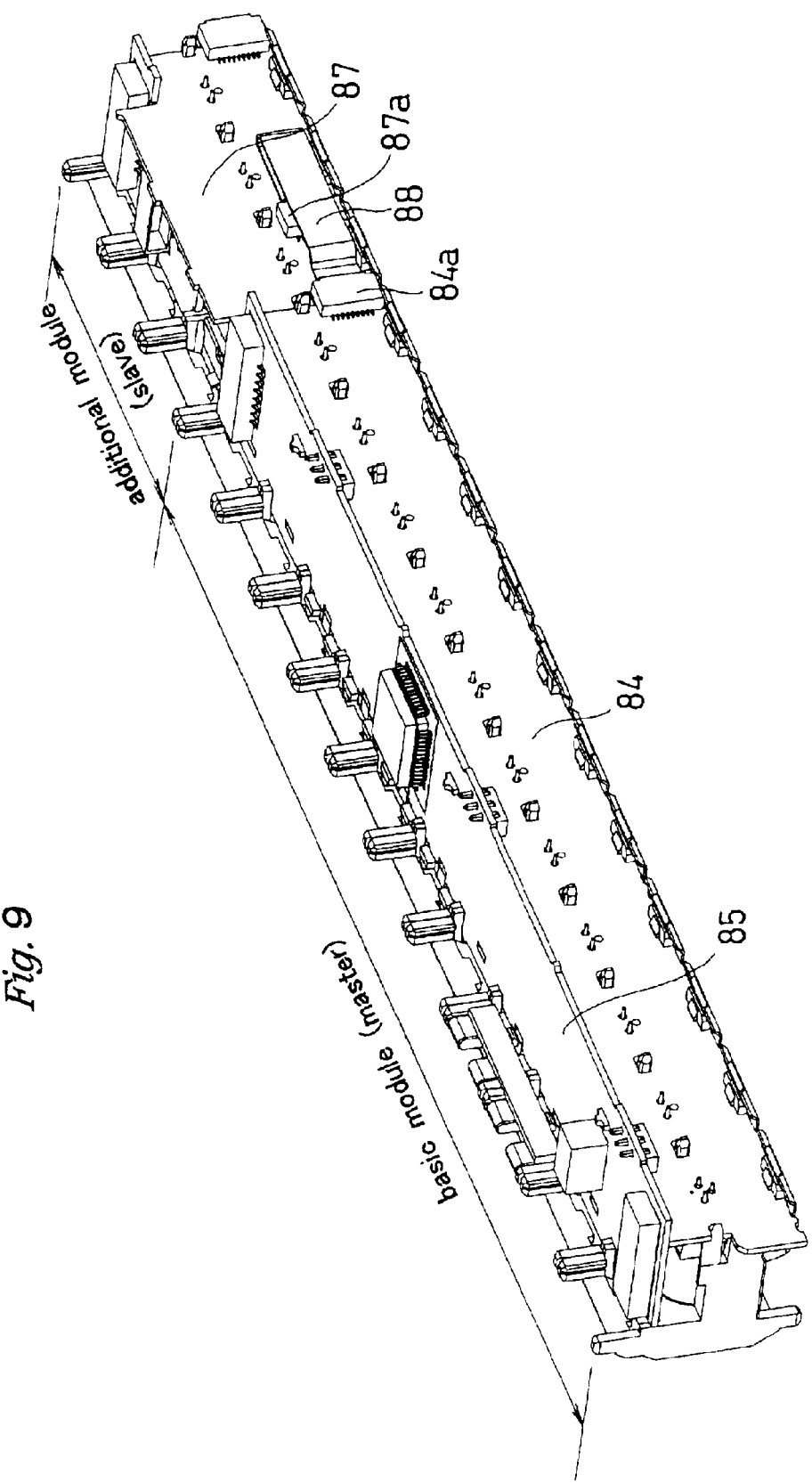
FIG. 9 is a perspective view of the exemplary optical module block as seen from below.
Figure 10:
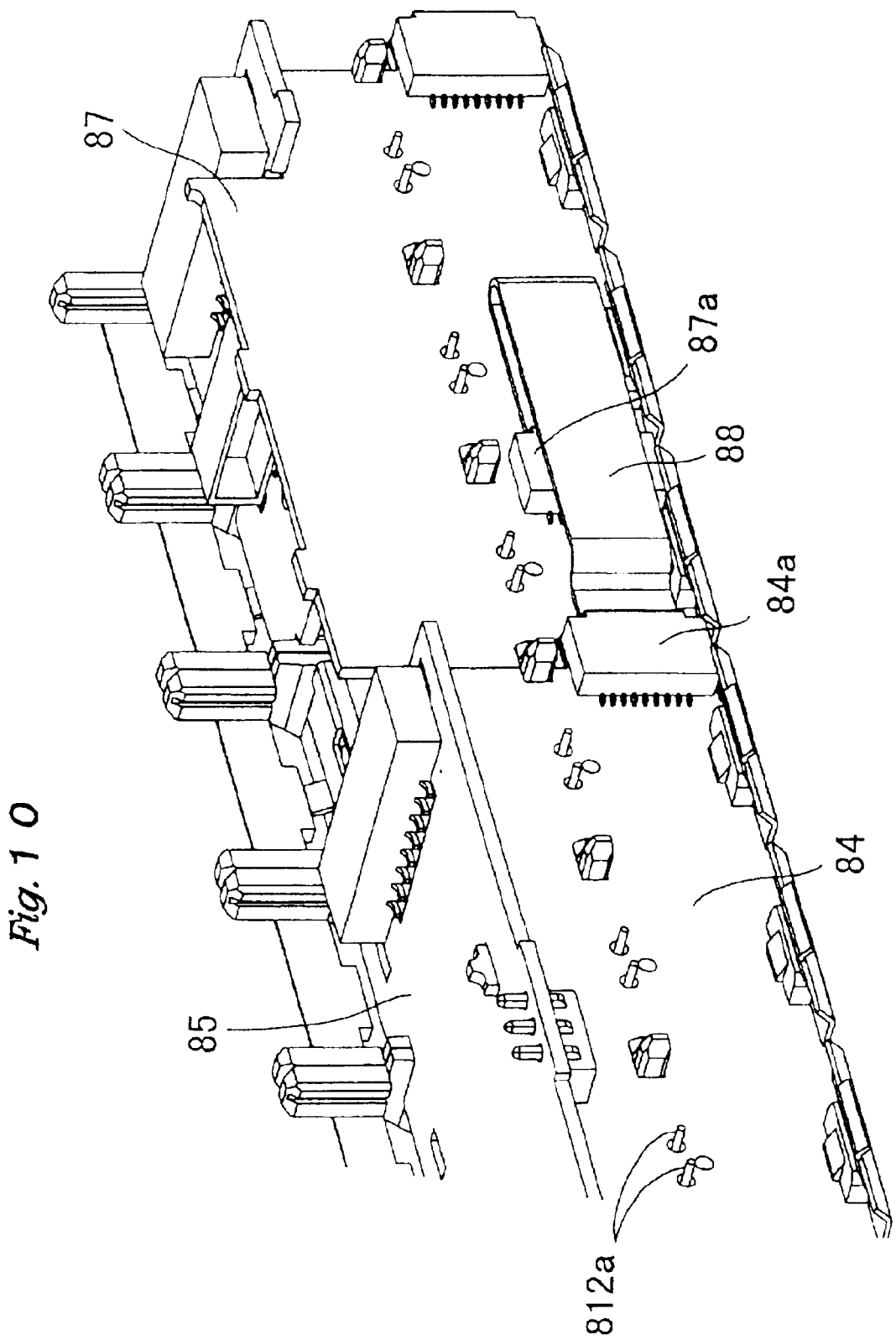
FIG. 10 is an enlarged fragmentary perspective view of the exemplary optical module block as seen from below.

Referring to FIGS. 8, 9 and 10, the arrangement of the circuit boards in relation to the optical module blocks 8 is described in the following. FIG. 8 is a perspective view showing an exemplary optical module block as seen obliquely from below, FIG. 9 is a perspective view of the optical module block as seen obliquely from below, FIG. 10 is an enlarged fragmentary perspective view of the optical module block as seen from below.

According to this embodiment, as shown in FIG. 9, a plurality of modules can be added to the basic modules. The basic modules in this case correspond to the optical module block 8a shown in FIG. 1, and the additional modules corresponding to each of the optical module blocks 8b to 8e shown in FIG. 1. Thus, according to the present invention, a plurality of kinds of optical module blocks 8a to 8e each having a different number of optical modules are prepared in advance so that they may be combined to suite the need of each particular application such as the length of the pillars for the light emitting and receiving elements, number of light beams and pitch of the light beams.

In this connection, the number of light beams can be selected at will by combining a plurality of kinds of optical module blocks 8b to 8e, and a desired pitch of the light beams can be readily achieved by adjusting the basic pitch incorporated in the first and second base frames 82 and 83.

When connecting a plurality of circuit boards, to ensure the accuracy in the pitch, it is necessary to join the adjacent circuit boards without any break between them. According to the illustrated embodiment, it is accomplished by properly arranging flat cables and associated connectors. As shown in the enlarged view of FIG. 10, a connector 84a is attached to an extreme edge portion of the master light beam circuit board 84, and a connector 87a is mounted on a corresponding slave light beam circuit board 84 at a position somewhat set back from the edge opposing the master light beam circuit board 84. These two connectors 84a and 87a are joined to each other by a flat cable 88. An adequate amount of slack is provided in the flat cable 88 to facilitate the replacement of the circuit boards.

As described above with reference to FIGS. 1 to 10, the light curtain generating device of this embodiment uses a light emitting element array and light receiving element array received in the corresponding pillar cases (each consisting of a case base 21, a window plate 22 and a pair of end caps 6) as assemblies of single-beam optical modules 81. Each single-beam optical module 81 comprises a lens member 811, optical element 812, and a plastic holder 813 integrally retaining them along the optical axial line. The lens member 811 is attached to the corresponding optical element 812 by using a snap fit arrangement (using the recesses 811a and projections 813, for example). The single-beam optical modules 81 are grouped into a plurality of optical module blocks 8a to 8e in each of which a plurality (11, 8, 4, 3 or 2 in the embodiment of FIG. 1) of single-beam optical modules 81 are arranged in a single row by being attached to the metallic plates (first base frame 82 and second base frame 83) having a prescribed length. Each individual single-beam optical module 81 forming the optical module blocks 8a to 8e is attached to the metallic plates (first base frame 82 and second base frame 83) by its sides extending in parallel with the optical axial line. The connection between each individual single-beam optical module 81 forming the optical module blocks 8a to 8e and the metallic plates (first base frame 82 and second base frame 83) is effected by using a snap fit arrangement (corresponding to the snap fit arrangements 813c and 813d) in each case.

This embodiment allows a plurality of single-beam optical modules to be handled as a group, and by using metallic plates, eliminates the need for a costly metallic die for making a plastic holder for retaining all of them which was used in the conventional arrangement. Furthermore, the metallic plates for holding the single-beam optical modules can be formed at will by using a suitable metal working process, and can adapt themselves to changes in the pitch of the light beams in both economical and flexible manner. Also, because the light emitting and receiving element arrays are formed of groups of single-beam optical modules, it is possible to change the length of the pillar assemblies for the light emitting and receiving elements by the length of one of the blocks so that they can be adapted to the changes in the size of the danger area, and the handling of each single-beam optical module is simplified. Also, only one metallic die assembly is needed for the holder, and the cost for the metallic die assembly is minimized. The assembly work for the single-beam optical modules is suited for mechanization by using a robot or the like. Because the optical axial line is in parallel with the metallic plates, the alignment of the optical axial line is simplified as compared with the case where each single-beam optical module is supported by its bottom. The assembly of each single-beam optical module block is also suited for mechanization by using a robot or the like. These are only some of the advantages of the present invention.

Figure 11:
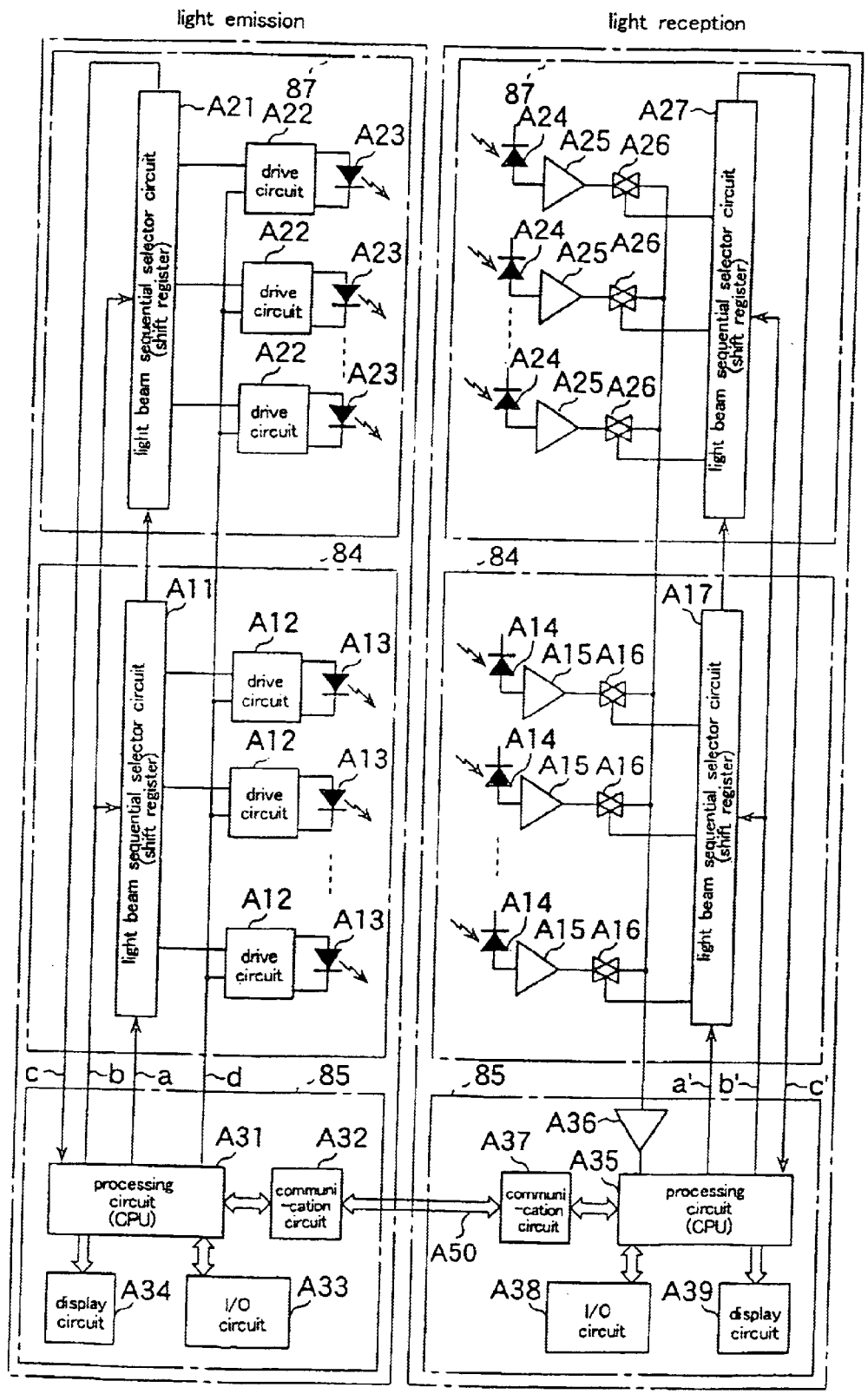
FIG. 11 is a circuit diagram showing the overall electric hardware arrangement of the light emitting and receiving pillar assemblies.
Figure 12:
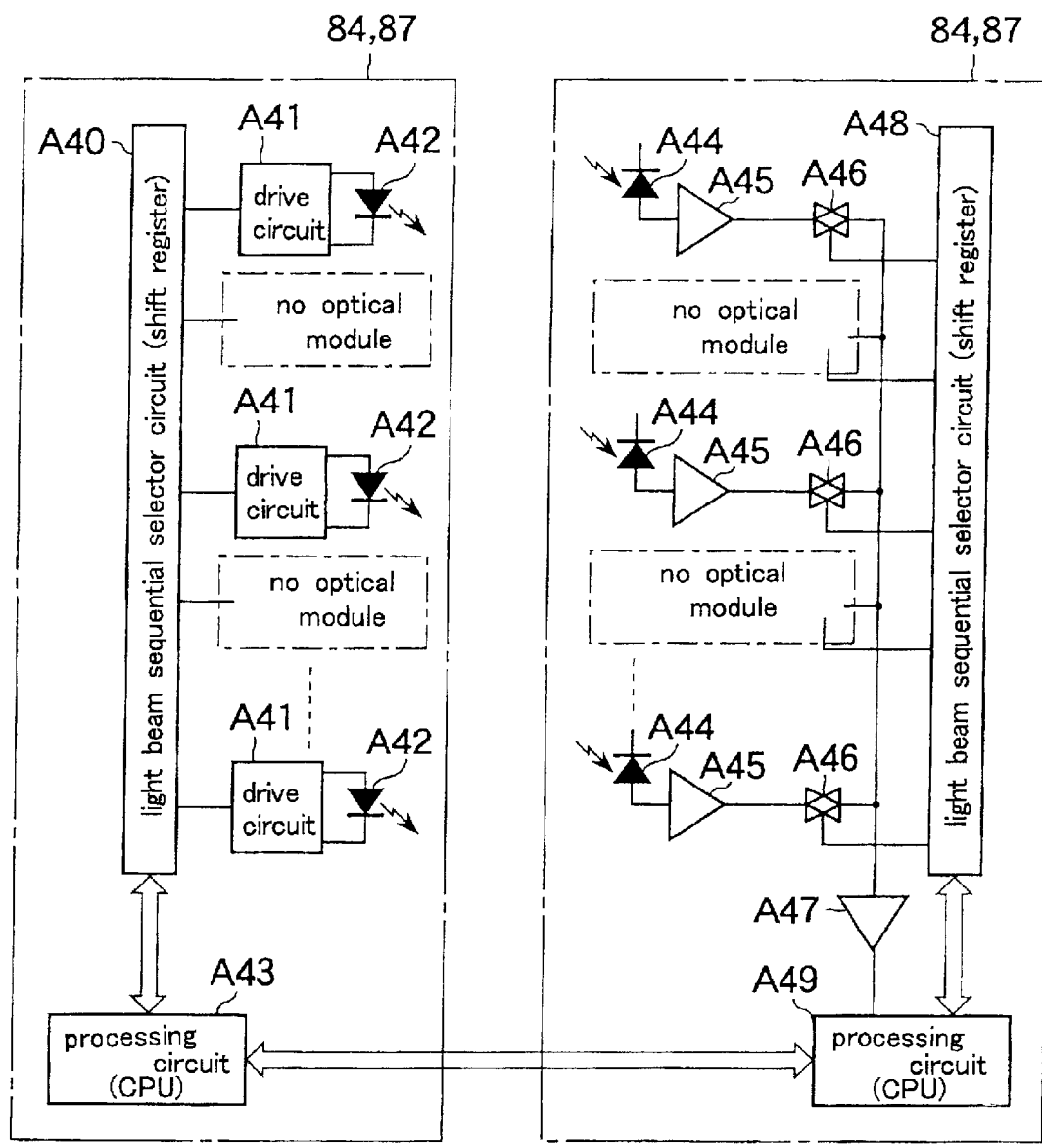
FIG. 12 is a general circuit diagram of the light emitting and receiving pillar assemblies when some of the single-beam optical modules are omitted.
Figure 13:
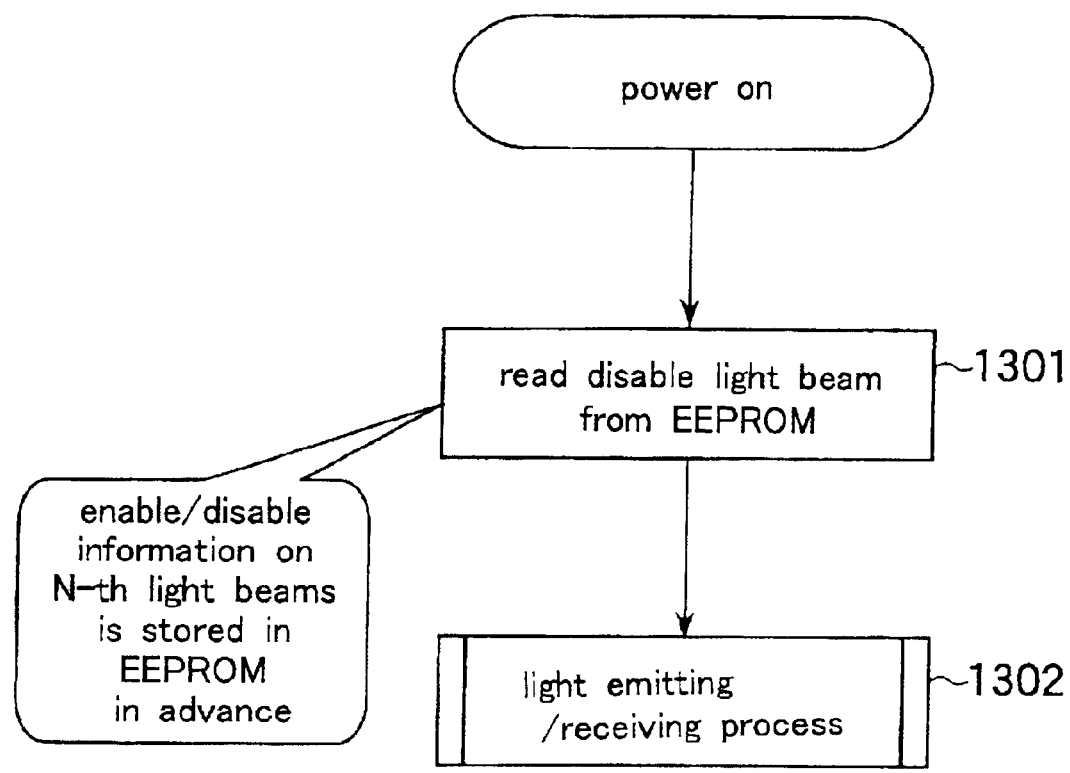
FIG. 13 is a flow chart (part 1) showing the process of disregarding the positions from which single-beam optical modules are omitted.
Figure 14:
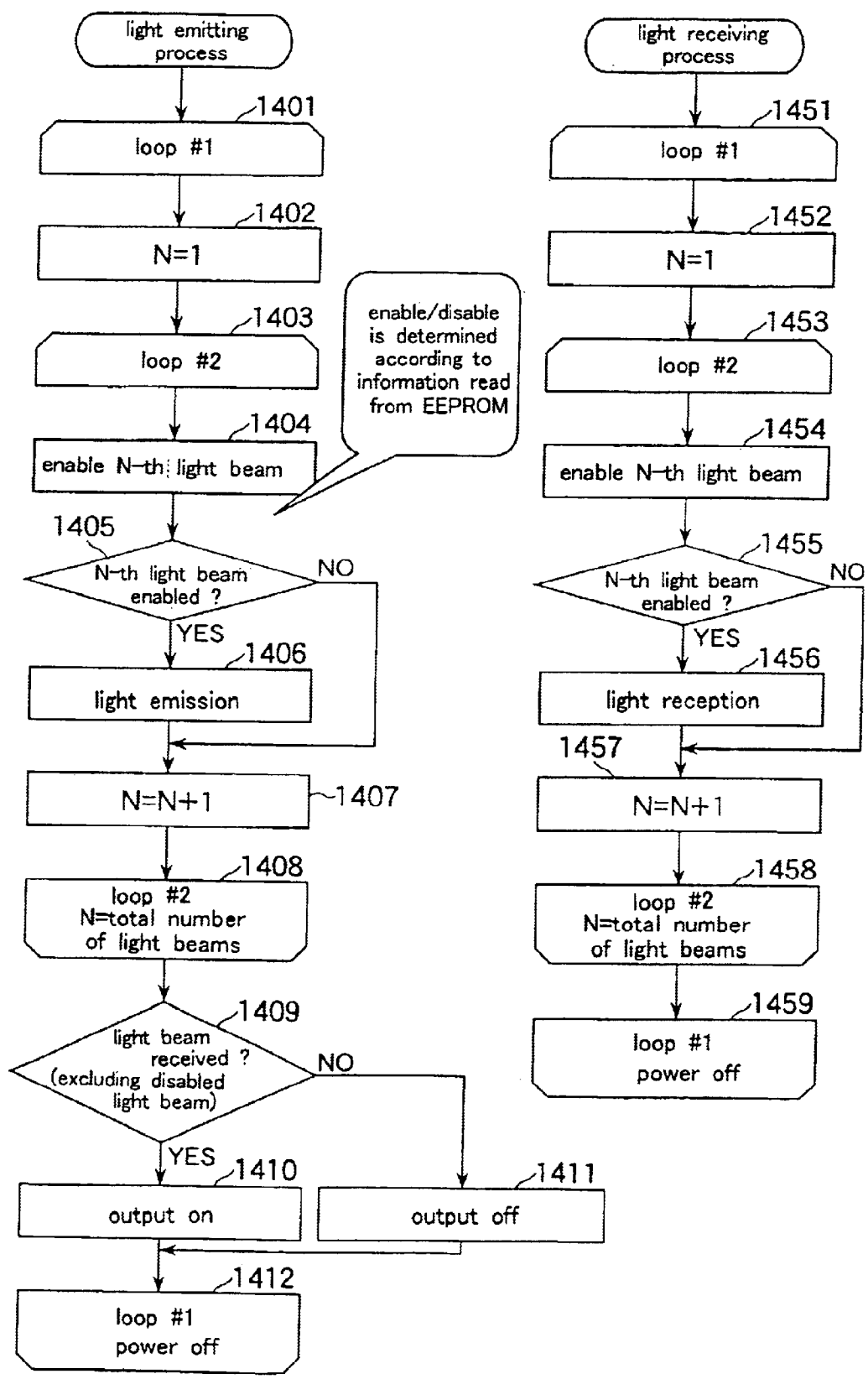
FIG. 14 is a flow chart (part 2) showing the process of disregarding the positions from which single-beam optical modules are omitted.
Figure 15:
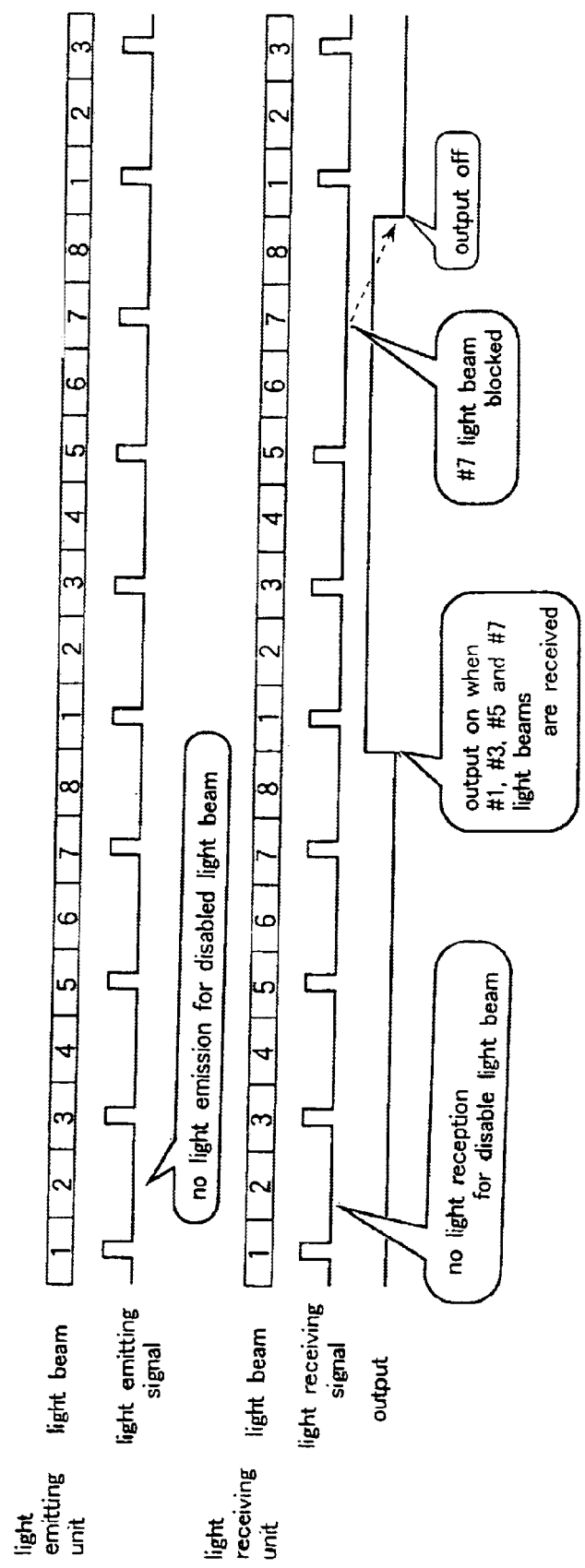
FIG. 15 is a time chart showing the process of disregarding the positions from which single-beam optical modules are omitted.
Figure 16:
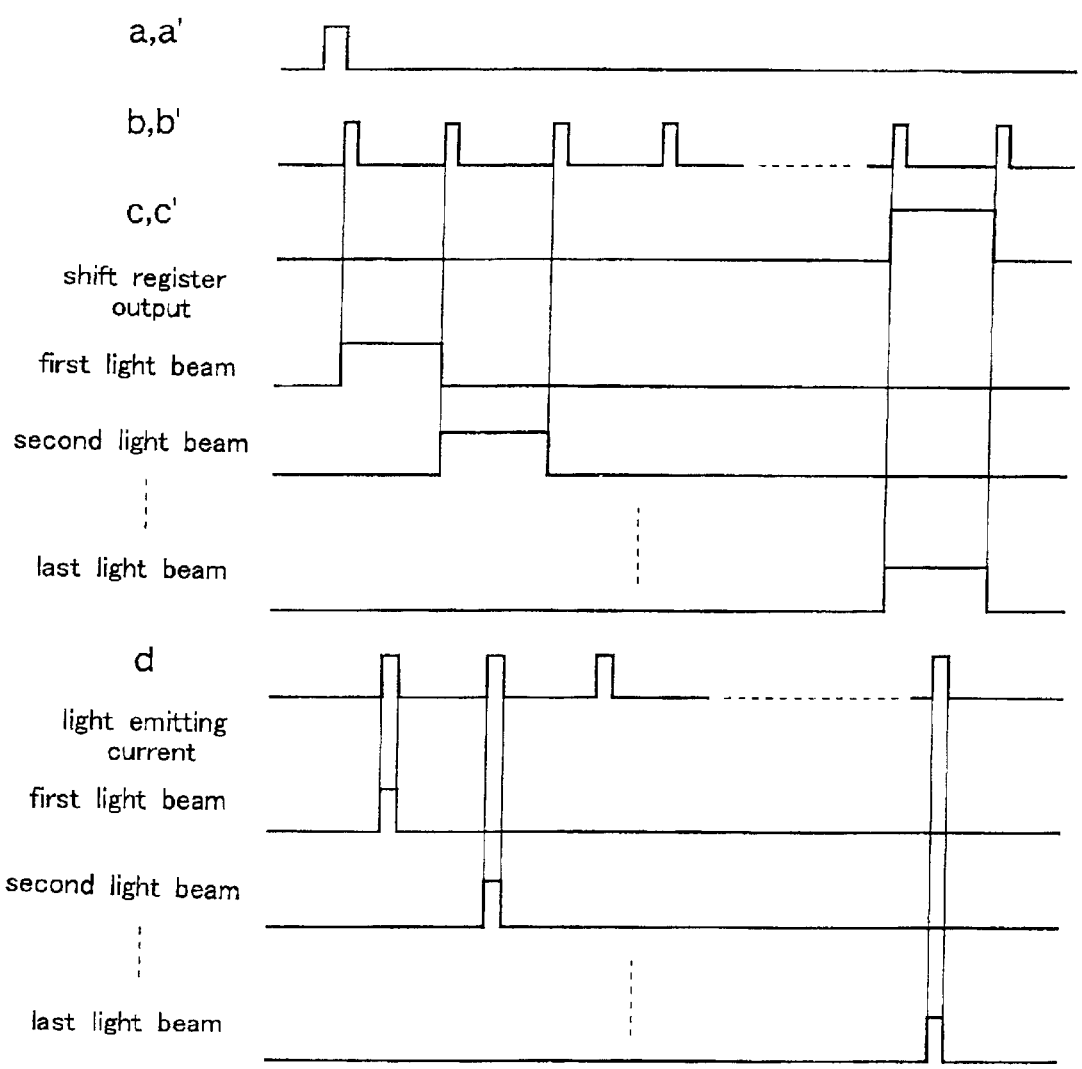
FIG. 16 is a time chart of the light beam selection signal process.

Now the electric structure and mode of operation of this embodiment is described in the following with reference to FIGS. 11 to 17. FIG. 11 is an overall circuit diagram showing the electric hardware structure of the pillar assemblies for light emitting and receiving elements, FIG. 12 shows the state of the overall circuit diagram when some of the single-beam optical modules are deliberately omitted, FIG. 13 is a flow chart (part 1) showing the process for disregarding the parts from which single-beam optical modules are deliberately omitted, FIG. 14 is a flow chart (part 2) showing the process for disregarding the parts from which single-beam optical modules are deliberately omitted, and FIG. 15 is a time chart of the process for disregarding the parts from which single-beam optical modules are deliberately omitted (when light beams 2, 4, 6 and 8 out of the 8 possible light beams) and FIG. 16 is a time chart of the process for selecting the light beams.

As shown in FIG. 11, the master light beam circuit board 84 and slave light beam circuit board 87 described above are each provided with an electric circuit for sequentially activating each light beam. More specifically, All and A21 denote light beam sequential selector circuits (shift registers), A12 and A22 denote drive circuits, A13 and A23 denote light emitting elements, A14 and A24 denote light receiving elements, A15 and A25 denote light receiving amplifiers, A16 and A26 denote analog switches to selectively activate each light beam, and A17 and A27 are light beam sequential selector circuits (shift registers).

The power circuit board 85 described above also carries circuits for controlling the light beam circuit boards 84 and 87. More specifically, A31 denotes a processing circuit (CPU), A32 denotes a communication circuit, A33 denotes an I/O circuit, A34 denotes a display circuit, A35 denotes a processing circuit (CPU), A36 denotes a buffer circuit, A37 denotes a communication circuit, A38 denotes an I/O circuit, and A39 denotes a display circuit.

The master light beam circuit board 84 for light emission carries a plurality of light emitting units, each consisting of a drive circuit A12 and a light emitting element A13, which correspond to the light beams in number. Likewise, the master light beam circuit board 84 for light reception carries a plurality of light receiving units, each consisting of a light receiving element A14 and a light receiving amplifier A15, which correspond to the light beams in number. The outputs from these light receiving units can be selectively taken out via an analog switch A16.

Similarly, the slave light beam circuit board 87 for light emission carries a plurality of light emitting units, each consisting of a drive circuit A22 and a light emitting element A23, which correspond to the light beams in number. Likewise, the slave light beam circuit board 87 for light reception carries a plurality of light receiving units, each consisting of a light receiving element A24 and a light receiving amplifier A25, which correspond to the light beams in number. The outputs from these light receiving units can be selectively taken out via an analog switch A26.

In the power circuit boards 85 for the light emission and light reception, the light beams are sequentially activated and a desired light curtain is formed by controlling signals a to d and a' to c' as shown in FIG. 16.

The mode of operation of the circuits for light emission and light reception is described in the following with reference to the time chart of FIG. 16. In the power circuits for light emission and reception, by establishing a communication via the synchronization communication line A50, synchronization pulses are put in signals a and a' in mutual synchronization, and shift clocks are then put into signals b and b' at a prescribed interval. Thus, "H" signals are sequentially forwarded to the outputs of the shift registers A11 and A21 for light emission and outputs of the shift registers A17 and A27 for light reception in synchronism with the pulse interval of the shift clocks. In response to this "H" signal, the drive circuits A12 and A22 for light emission and analog switches A16 and A26 are activated so that the state of light emission and reception for each of the light beams ranging from the first light beam to the last light beam is fed to the processing circuit A35 for light reception via the buffer amplifier A35. Then, by executing a prescribed determination process in the processing circuit A35, the presence of an object crossing the light curtain is detected and a corresponding switching output is produced.

Thus, when the light emitting units and light receiving units are installed for all the optical axial lines for light emission and light reception, the presence of an object is detected from each of the light beams that are present.

Now the process of producing pillar assemblies for light emission and light reception having various numbers of light beams and different pitches of light beams by selectively omitting light emitting units and light receiving units from the circuit boards for light emission and light emission is described in the following.

Referring to FIG. 12, according to the illustrated embodiment, the circuit boards 84 and 87 for light emission and light reception, respectively, are each allocated with a plurality of mounting positions for optical elements. Therefore, if a particular set of a drive circuit A41 and a light emitting element 42 forming a light emitting unit or a particular set of a light receiving element A44 and a light receiving amplifier A45 forming a light receiving unit is removed, the corresponding light beam does not exits, and a light beam pitch which is a multiple of the basic light beam pitch can be readily achieved. Regarding the positions where a light emitting unit or a light receiving unit is omitted, a signal process would be necessary to electrically cancel the corresponding light beam.

Such a signal process can be accomplished by executing the process expressed by the flow chart shown in FIGS. 13 and 14 by using the processing circuits A43 and A49 for light emission and light reception, respectively. The time chart for this process is shown in FIG. 15.

Referring to FIG. 13, as soon as the process is started, light beams that are going to be disabled are read out from EEPROM (step 1301). To this end, the enable/disable information for the N-th light beam is stored in the EPPROM incorporated in the processing circuits A43 and A49.

Then, according to the enable/disable information for the N-th light beam, the light emitting/receiving process is executed (step 1302).

As shown in FIG. 14, in the light receiving process forming a part of the light emitting/receiving process, as the value N of the light beam pointer is incremented from the initial value of "1" by "+1" each time (steps 1402 and 1407), the enable/disable state is determined from the information read out from the EEPROM (step 1404), and the light receiving process is selectively executed (step 1406) depending on the determination result (step 1405).

Once the value N of the light beam pointer reaches the total number of the light beams (steps 1403 and 1408), it is determined if all of the light beams are enabled (excluding the disabled light beams) (step 1409). The sensor output is turned ON if all of the light beams are enabled (step 1410), and the sensor output is otherwise turned OFF (step 1411). The foregoing process is repeated until the power is turned off (steps 1401 and 1412).

As for the light emitting process, as the value N of the light beam pointer is incremented from the initial value of "1" by "+1" each time (steps 1452 and 1457), the enable/disable state is determined from the information read out from the EEPROM (step 1454), and the light emitting process is selectively executed (step 1456) only when the determination result indicates "enable" (step 1455 yes). The foregoing process is repeated for all of the light beams (steps 1453 and 1458) until the power is turned off (step 1459).

The state of the signals of the light emitting units and light receiving units during the execution of the above described process is shown in FIG. 15. In this example, light beams 2, 4, 6 and 8 out of the eight light beams are disabled.

As shown in the drawing, on the side of the light emitting units, the light emitting signals are generated only for light beams 1, 3, 5 and 7, and no light emitting signals are generated for light beams 2, 4, 6 and 8 corresponding to the positions from which light emitting units are omitted.

As for the light receiving units, the light receiving signals are generated only at the timing for light beams 1, 3, 5 and 7 to determine the reception of the light beams, but no light receiving signals are generated at the timing for light beams 2, 4, 6 and 8 corresponding to the positions from which light emitting units are omitted.

Therefore, the outputs of the light receiving units turn ON upon receiving light beams 1, 3, 5 and 7 initially, but the output of the light unit corresponding to light beam 7 turns OFF as light beam 7 is blocked in the next instance. In the meantime, the reception of light beams 2, 4, 6 and 8 does not affect the outputs of the light receiving units. In other words, a light beam pitch of twice the normal light beam pitch is thereby readily accomplished. Furthermore, regarding the disabled light beams, the corresponding light emitting units and light receiving units are not required to be mounted, and no optical components are wasted on them.

Figure 17:
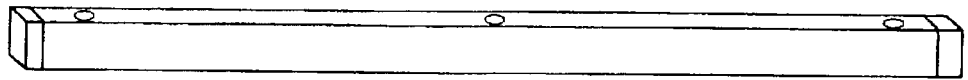
FIGS. 17(a) to (c) are schematic views showing exemplary light emitting or receiving pillar assemblies having different number of light beams and different light beam pitches.
Figure 17:
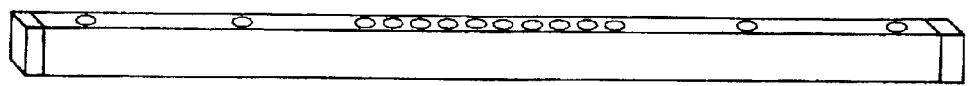
Figure 17:
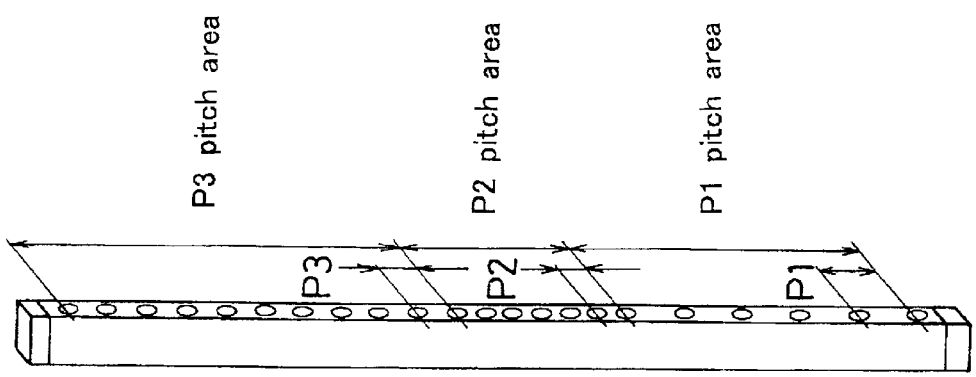
Figure 18:
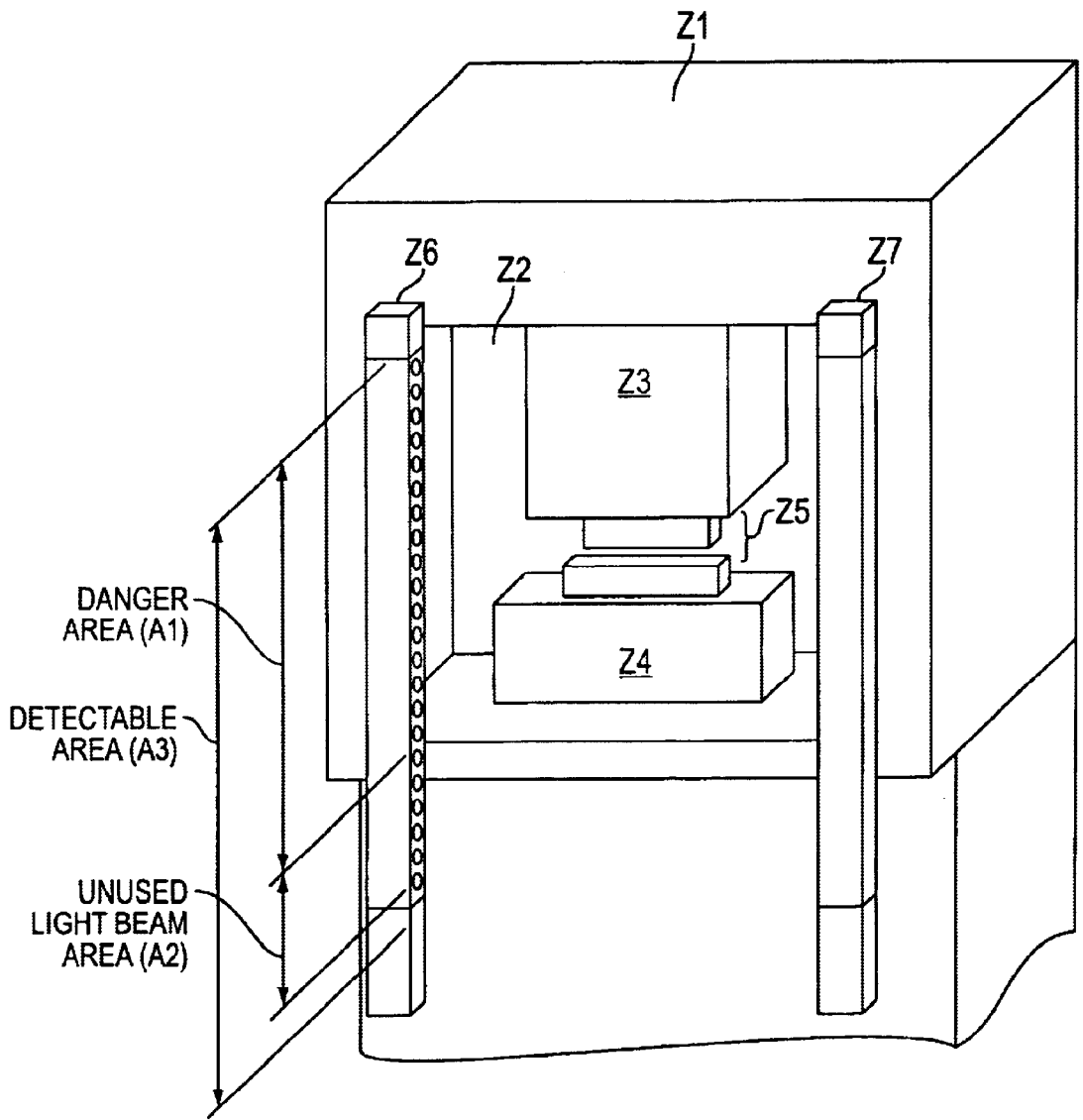
FIG. 18 is a schematic view showing the installed state of a conventional light emitting and receiving pillar assemblies.

FIGS. 17(*a*), 17(*b*) and 17(*c*) schematically illustrate exemplary pillar assemblies for light emission and light reception having different numbers of light beams and different light beam pitches. In the case of the example illustrated in FIG. 17(*a*), the light curtain includes three detection areas (P1 pitch area, P2 pitch area and P3 pitch area) within the entire detection area of the pillar.

In the case of the example illustrated in FIG. 17(*b*), the light curtain includes a central detection area having a fine light beam pitch and upper and lower detection areas having a coarse light beam pitch within the entire detection area of the pillar.

In the case of the example illustrated in FIG. 17(*c*), the light curtain includes only three light beams which are highly coarsely arranged one in the middle, and two at upper and lower ends of the entire detection area of the pillar.

The three different light curtains shown in FIGS. 17(*a*) to 17(*c*) can be achieved by using only single-beam optical modules and changing the light beam pitch or omitting some of them. Therefore, according to the illustrated embodiments, a light curtain having various modes of light beams can be achieved more easily and economically as compared with the conventional device for generating a light curtain.

As can be appreciated from the foregoing description, according to the present invention, the light curtain generating device can be selectively fabricated so as to be able to adapt itself in terms of the length of the pillars for light emission and reception, number of light beams and light beam pitch according to the width of the danger area and the diameter of the smallest object that is desired to be detected.

Although the present invention has been described in terms of preferred embodiments thereof, it is obvious to a person skilled in the art that various alterations and modifications are possible without departing from the scope of the present invention which is set forth in the appended claims.

What is claimed is:

1. A light curtain generating device, comprising a light emitting pillar assembly accommodating an array of light emitting units within a pillar case and a light receiving pillar assembly accommodating an array of light receiving units within a pillar case, the light emitting pillar assembly and light receiving pillar assembly being placed opposite to each other so as to form a light curtain for detecting an object between the pillar assemblies, characterized in that:

the light emitting unit array and light receiving unit array accommodated in the respective pillar cases each comprise a group of single-beam optical modules, each single-beam optical module comprising a single light emitting unit or a single light receiving unit comprising a lens, an optical element and a holder integrally incorporated with the lens and optical element so as to align the lens and optical element with a prescribed optical axial line, and the holder being separated from holders of other single-beam optical modules, each pillar case accommodating a base frame defining mounting positions for a plurality of single-beam optical modules, and each single-beam optical module being mounted in the mounting position of the base frame.

2. A light curtain generating device according to claim 1, wherein each opposing pair of a light emitting unit and a light receiving unit perform a detecting action in a prescribed order.

3. A light curtain generating device according to claim 1, wherein the holder is made of plastic material.

4. A light curtain generating device according to claim 1, wherein the base frame comprises a metallic plate member, and each single-beam optical module is attached to the metallic plate at a side of the single-beam optical module extending in parallel with the optical axial line.

5. A light curtain generating device according to claim 1, further comprising a circuit board having a plurality of optical element mountable positions, and signal processing means for electrically and selectively disabling the optical element mountable positions.

6. A light curtain generating device according to claim 1, wherein each pillar case accommodates at least two base frames arranged in series along a length of the pillar.

7. A light curtain generating device according to claim 6, wherein the mounting positions of the two base frames have different pitches.

8. A light curtain generating device according to claim 6, wherein the two base frames have different numbers of mounting positions.

9. A light curtain generating device according to claim 6, wherein the two base frames have different lengths.

10. A light curtain generating device according to claim 6, wherein the base frames comprise metallic plate members.

11. A light curtain generating device, comprising a light emitting pillar assembly accommodating an array of light emitting units within a pillar case and a light receiving pillar assembly accommodating an array of light receiving units within a pillar case, the light emitting pillar assembly and light receiving pillar assembly being placed opposite to each other so as to form a light curtain for detecting an object between the pillar assemblies, characterized in that:

the light emitting unit array and light receiving unit array accommodated in the respective pillar cases each comprise a group of single-beam optical modules, each single-beam optical module comprising a single-light emitting unit or a single light receiving unit comprising a lens, an optical element and a holder integrally incorporated with the lens and optical element so as to align the lens and optical element with a prescribed optical axial line, and the holder being separated from holders of other single-beam optical modules, each pillar case accommodating a base frame defining mounting positions for a plurality of single-beam optical modules, and each single-beam optical module being mounted in the mounting position of the base frame, wherein the holder is made of plastic material, wherein the lens and optical element are jointed to the plastic holder by snap fit arrangements.

12. A light curtain generating device, comprising a light emitting pillar assembly accommodating an array of light emitting units within a pillar case and a light receiving pillar assembly accommodating an array of light receiving units within a pillar case, the light emitting pillar assembly and light receiving pillar assembly being placed opposite to each other so as to form a light curtain for detecting an object between the pillar assemblies, characterized in that:

the light emitting unit array and light receiving unit array accommodated in the respective pillar cases each comprise a group of single-beam optical modules, each single-beam optical module comprising a single light emitting unit or a single light receiving unit comprising a lens, an optical element and a holder integrally incorporated with the lens and optical element so as to align the lens and optical element with a prescribed optical axial line, and the holder being separated from holders of other single-beam optical modules, each pillar case accommodating a base frame defining mounting positions for a plurality of single-beam optical modules, and each single-beam optical module being mounted in the mounting position of the base frame, wherein the base frame comprises a metallic plate member, and each single-beam optical module is attached to the metallic plate at a side of the single-beam optical module extending in parallel with the optical axial line, wherein each single-beam optical module is attached to the metallic plate by a snap fit arrangement.

* * * * *